United States Patent [19]

Cremonesi et al.

[11] Patent Number: 4,507,205
[45] Date of Patent: Mar. 26, 1985

[54] PROCESS FOR THE PURIFICATION OF GLUCOSAMINOGLUCANS

[75] Inventors: Pietro Cremonesi; Giancarlo Sportoletti, both of Milan, Italy

[73] Assignee: Italfarmaco S.P.A., Milan, Italy

[21] Appl. No.: 237,880

[22] Filed: Feb. 25, 1981

[30] Foreign Application Priority Data

Feb. 29, 1980 [IT] Italy ................................ 20314 A/80
Feb. 9, 1981 [IT] Italy ................................ 47754 A/81

[51] Int. Cl.$^3$ .......................................... B01D 13/00
[52] U.S. Cl. ..................................... 210/638; 210/651
[58] Field of Search ...................... 210/651, 650, 638; 424/321.1, 183, 101, 177; 260/121, 112 B

[56] References Cited

U.S. PATENT DOCUMENTS 3,228,877 1/1966 Mahon ................................ 210/638
3,817,831 6/1974 Mancilla et al. ................. 210/638 X

OTHER PUBLICATIONS

Michaels, "New Separation Technique for the CPI", from Chem. Eng. Progress, vol. 64, No. 12, pp. 31–43.
Porter et al., "Membrane Ultrafiltration", from Chem. Tech., 1-1971, pp. 56–63.

Primary Examiner—Frank Spear
Attorney, Agent, or Firm—Bucknam and Archer

[57] ABSTRACT

A process for the removal of components having low or no anticoagulant activity from a glucosaminoglucan is described which comprises subjecting said glucosaminoglucan in the form of a salt in an aqueous solution to flow across a membrane suitable for ultrafiltration, hyperfiltration (inverse osmosis) or dialysis with partial passage through said membrane, whereby fractions of low activity go through the membrane and fractions of higher activity do not go through the membrane and are concentrated. The membrane suitable for ultrafiltration may have a nominal molecular cut-off between 1000 and 15,000. The membrane suitable for dialysis may have a nominal molecular cut-off at less than 30,000. The glucosaminoglucan may be heparin in the form of the sodium or calcuium salt.

2 Claims, No Drawings

PROCESS FOR THE PURIFICATION OF GLUCOSAMINOGLUCANS

The present invention relates to glucosaminoglucans and their biological and therapeutical activity. More specifically, the present invention relates to the anticoagulant, antilipemic and anti $X_a$ activities of glucosaminoglucans.

BACKGROUND OF THE INVENTION

Due to their chemical structure, glucosaminoglucans exhibit polydispersity of molecular weight and the correlation between biological activity, structure and weight has not yet been clarified. Recently, several reports have appeared in the literature showing that fractionation of glucosaminoglucans on the basis of the molecular weight or on the basis of their affinity for other substances having appropriate biological activity is possible. Certainly, it would be very desirable from a therapeutical point of view to obtain purer fractions and fractions with a higher degree of specific activity, whether it is anticoagulant, antilipemic or antithrombotic activity. For instance, in the case of heparin which exhibits an average distribution of molecular weight between 5000 and 20000 it has been reported by L. O. Andersson, T. W. Barrowcliffe, E. Holmer, E. A. Johnson and G. E. C. Sims, Thrombosis Research, 9, 575–583, (1976); R. Jordan, D. Beeler, R. Rosenberg, J. Biol. Chem., 254, 2902–2913 (1979); H. J. Rodriguez and A. J. Vanderwielen, J. Pharm. Sci., 68, 588–591 (1979), that fractions of average molecular weight between 5000 and 14,000 exhibit an anticoagulant specific activity in the range of 40% of a fraction having an average molecular weight of 12000.

The fractions of molecular weight 5000, which are obtained by chromatography and affinity towards antithrombin, give fractions some of which exhibit a high anticoagulant activity, for instance 250–300 U.I./mg, whereas other fractions exhibit antithrombotic or antilipemic activity. These methods of fractionation, in general, have been carried out on a laboratory scale using chromotographic techniques. Even when it is feasible to extend these methods to a larger scale, it is likely that the fractions become contaminated, and that the stability of the chromotographic supports is affected, both phenomena seriously interfering with the application of these methods to an industrial scale as continuous processes. Further, in addition to the problems, relating to enrichment or isolation of activities, there are other problems inherent to commercial glucosaminoglucans. More specifically, glucosaminoglucans are manufactured by organs of several animals, such as bovine, swine, etc., such as lungs, intestinal mucosa, etc. The extraction processes are very complex because they include the step of enzymatic proteolysis of the glycoproteins starting material, salt formation with ammoniacal quaternary salts or the use of ion exchange resins and, in general, more than one precipitation with alcoholic solvents in the presence of salts, etc., is required. The crude product obtained from the first purification must then be subjected to time-consuming purifications which lead to various commercial glucosaminoglucans of high purity. In any event, in the purified product, it is likely that there remains:

(a) organic or inorganic impurities which on one hand do not exhibit specific biological activities and, on the other hand, are likely to cause serious technological problems during actual use, and further they are likely to lower the specific biological activity, for instance the U. I. anticoagulant/mg, (b) impurities, the presence of which is not acceptable because of an inherent negative potential activity on a biological level. Typical among these types of impurities are the oxidizing substances which are utilized in the final step to decolorize the product.

Several methods have been proposed, some of which have not been patented, which lead more or less to the elimination of these impurities. These methods are based on the use of ion exchange resins, selective precipitation, etc.

SUMMARY OF THE INVENTION

The crux of the present invention resides in the finding that it is possible to utilize methods which may be readily adapted to larger scale production, which lead to a higher degree of purity of commercial glucosaminoglucans or which increase the specific activities.

The methods according to the present invention are based on the finding that it is possible to fractionate glucosaminoglucans exhibiting a polydispersity of molecular weight, and/or, more specifically to eliminate some components exhibiting low molecular weight which exhibit low biological activity, for instance heparin, which exhibits low anticoagulant activity by means of membranes. Certain membranes are known, which are capable of letting predetermined substances go through, depending upon the characteristic properties of the membrane or depending upon the physico-chemical properties of the solvent or the physico-chemical properties of the solution.

The methods according to the present invention consists of letting a solution of the glucosaminoglucans to be purified, be subjected to ultrafiltration or hyperfiltration (inverse osmosis) or dialysis by means of suitable membranes, in a suitable concentration and under conditions reported in more detail in the examples, so that partial passage through the membranes occurs.

More generally, ultrafiltration, inverse osmosis or flow dialysis may be used depending upon the type of the final product which is required and the desired degree of purity as it will appear in more detail in the examples hereinbelow.

Further, it has been reported that the treatment of metallic salts of glucosaminoglucans, and specifically heparin with procedures which involve the intermediate formation of the corresponding free acid, that is heparinic acid, leads to a decrease of the biological activity of the final product. Usually, this sort of treatment is carried out by means of ionic exchangers. On the other hand, it has now been found that if the stage of setting the acid free is carried out by means of the processes mentioned hereinabove, with a suitable control of the temperature, no decrease of the specific biological activity of the final purified product occurs.

Several examples are described hereinbelow for the purpose of illustrating the type of treatment of glucosaminoglucans in accordance with the present invention, which achieves enrichment or isolation of activities by the use of a membrane, but are not intended to limit the invention.

EXAMPLE 1

Purification of sodium heparinate, by ultrafiltration through a membrane having a molecular cut-off at 10,000

A solution of concentration between 1 and 15% of sodium heparinate (U.I. 155/mg of anticoagulant activity) in bidistilled water is used. It is still preferable to use a solution of 7% concentration which is subjected to ultrafiltration in a suitable apparatus, for instance Amicon Model 52, keeping the solution under adequate stirring in order to avoid the occurrence of polarization phenomena resulting from concentration in the proximity of the membrane. This permits to retain diffusion fluxes through the membrane to a sufficient extent, for instance, 0.2 cm/min, applying pressures between 0.5 and 5 atmospheres. The final conditions are: temperature 20° C., but it is possible to use a range between 4° and 35° C.; the pH of the solution is 6.5, but a range between 2.5 and 8.5 may be used.

A membrane with a nominal cut-off less than 10,000, for instance, Amicon P.M. 10, may be used.

The solution is concentrated with the ultrafilter up to a value in the range of 50% of the initial value. The material which goes through is collected and subjected to lyophilization. The biological titer of the material after lyophilization, expressed in anticoagulant units, is less than 100 U.I./mg; the anti $X_a$ activity is 180 U.I./mg.

The material which does not go through the membrane after being collected, is subjected to lyophilization. The biological titer of the material, expressed in anticoagulant units, is 193 U.I./mg; anti $X_a=78$ U.I./mg.

EXAMPLE 2

Purification of sodium heparinate by means of ultrafiltration through a membrane having a nominal molecular cut-off at 5000

This example is carried out in the same manner as Example 1, except that a membrane having a nominal molecular cut-off less than 5000 is used. An example of the membrane, is Berghoff BM 50. The values of biological activity are for the material that goes through the membrane, 11 U.I./mg and for the material which does not go through the membrane, 189 U.I./mg. (anti $X_a=196$ and 50 U.I./mg, respectively).

EXAMPLE 3

Purification of heparin by means of hyperfiltration through a membrane having a molecular cut-off less than 600

An aqueous solution of heparin, either in the form of the sodium salt or the calcium salt or another ion, may be used, of concentration between 1 and 15%, but preferably 4%. This solution is subjected to hyperfiltration by means of a suitable apparatus provided with a feed pump under a pressure between 2 and 25 atmospheres, but preferably higher than 5 atmospheres. The heparin solution flows with a laminar flow on a suitable membrane, for instance Osmonix Sepa 50, having a molecular cut-off at less than 600.

There is obtained material which goes through the membrane (not analyzed). The material which does not go through is recycled. The heparin concentration in the recycled material is kept constant by continuous addition of water.

In this manner, one achieves the result of removing from the original solution substances which have molecular weight less than 600 and which, in any event, go through the membrane.

In the experiment, there has been used the sodium salt of heparin with 171 U.I./mg of anticoagulant activity, which exhibits a high oxidizing power, the oxidizing power being derived from the process used for the decolorization of the material by means of hydrogen peroxide or peracids.

The sodium salt of heparin which is recovered from the material which did not go through exhibits and anticoagulant activity of 178 U.I./mg, but does not exhibit any oxidizing power.

The yield of the process is higher than 90% expressed in weight percent.

EXAMPLE 4

Purification of heparin by means of flow dialysis for the removal of oxidizing substances Aqueous solutions of heparin in the form of the sodium salt or calcium salt or another ion are used for this experiment. The concentration is between 1 and 20%, preferably 5%. They are dialyzed with a laminar flow dializer of the type usually used for hemodialysis, which has hollow fibers or multiple layers, against aqueous solutions of pH between 2 and 3. The pH is adjusted by means of mineral acid.

The temperature is kept in the range of 4°-7° C. by means of suitable cooling systems.

The flow velocity used for the experiment is in a range between 10 and 100 ml/min per 0.7 m$^2$ of membrane in the compartment of the dialyzing solution, and in the range of 20 up to 400 ml/min per 0.7 m$^2$ of membrane in the dialyzed compartment.

The dialyzing solution which contains the sodium heparinate is recycled while the solution in the compartment of the dialyzate is continuously renewed.

The dialysis is allowed to proceed up to the disappearance of any oxidizing power in the solution of the dialyzing substance as well as the dialyzate. The heparinic acid is successively transformed into calcium heparinate by neutralization with calcium oxide and treatment with calcium chloride, following one of the know procedures conventionally used.

The calcium heparinate recovered by alcoholic precipitation exhibits an anticoagulant titer equal to 156 U.I./mg using sodium heparinate as a starting material with essentially equal anticoagulant activity.

What is claimed is:

1. The process of fractionation of sodium heparinate wherein sodium heparinate of U.I. 155/mg of anticoagulant activity is subjected to ultrafiltration with a membrane having a cut-off at 10,000, and the material recovered from the portion which does not go through the membrane, after lyophilization exhibits anticoagulant activity of 193 U.I./mg., and anti $X_a$ activity of 78 U.I./mg, whereas the corresponding activities of the permeate are less than 100 U.I./mg and, respectively, 180 U.I./mg.

2. The process of fractionation of sodium heparinate wherein sodium heparinate of anticoagulant activity 155 U.I./mg is subjected to ultrafiltration with a membrane having a nominal cut-off at 5000 and a non-permeate material with anticoagulant activity=189 U.I./mg and anti $X_a$ activity=50 U.I./mg is separated, whereas the corresponding activities of the permeate are 11 U.I./mg and 196 U.I./mg respectively.

* * * * *